United States Patent [19]

Onoda

[11] Patent Number: 4,526,522

[45] Date of Patent: Jul. 2, 1985

[54] HERMETIC TYPE COMPRESSOR AND PRODUCTION METHODS THEREOF WITH REDUCED THICKNESS CASING PORTIONS FOR WELDING

[75] Inventor: Izumi Onoda, Fuji, Japan

[73] Assignee: Tokyo Shibaura Denki Kabushiki Kaisha, Kawasaki, Japan

[21] Appl. No.: 511,244

[22] Filed: Jul. 6, 1983

[30] Foreign Application Priority Data

Jul. 8, 1982 [JP] Japan ................... 57-117845

[51] Int. Cl.³ ............... F04C 18/00; F04C 29/00; B23K 31/02
[52] U.S. Cl. ................... 418/63; 418/270; 417/902; 219/127; 228/265
[58] Field of Search ........... 418/63, 270; 417/902; 219/127, 137 R; 228/265

[56] References Cited

U.S. PATENT DOCUMENTS 2,031,138  2/1936  Taylor ............... 219/137 R
2,113,691  4/1938  Heller ............... 417/902
4,302,657  11/1981  Turelli et al. ........ 219/137 R

FOREIGN PATENT DOCUMENTS 50-15609  5/1975  Japan .
57-102594  6/1982  Japan ............... 418/63

*Primary Examiner*—John J. Vrablik
*Attorney, Agent, or Firm*—Schwartz, Jeffery, Schwaab, Mack, Blumenthal & Evans

[57] ABSTRACT

In a hermetic type compressor including a casing, an electric motor provided in the casing for rotating a driving shaft, and a compressor unit including a cylinder forcibly inserted in the casing, there are provided a method and a device for securing the compressor unit to the casing, wherein reduced thickness portions are provided on the outer surface of the casing so that welding can be carried out from outside of the casing through the reduced thickness portions. In this manner, heat generated in the welded portions can be reduced substantially, and various disadvantages caused thereby can be eliminated.

6 Claims, 9 Drawing Figures

U.S. Patent  Jul. 2, 1985  4,526,522
FIG. I
PRIOR ART
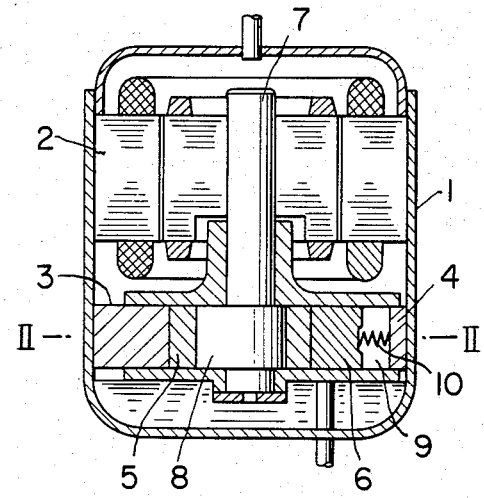
FIG. 2
PRIOR ART
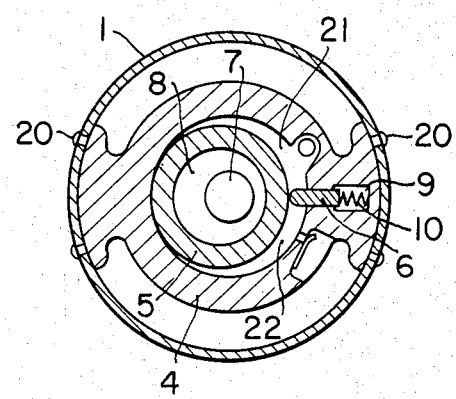
PRIOR ART
FIG. 3
PRIOR ART
FIG. 4
PRIOR ART
FIG. 5
FIG. 6
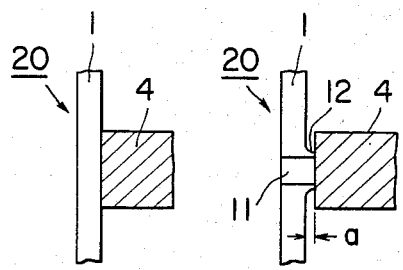
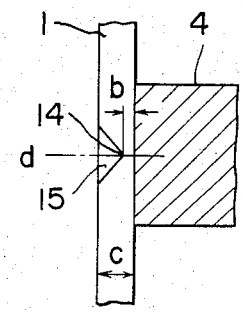
FIG. 7
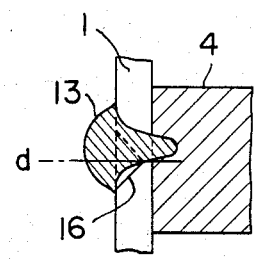
FIG. 8
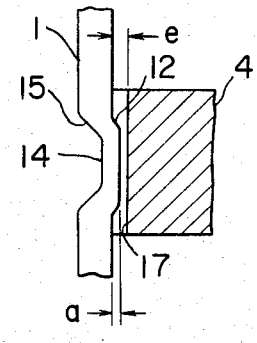
FIG. 9
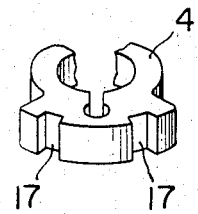

HERMETIC TYPE COMPRESSOR AND PRODUCTION METHODS THEREOF WITH REDUCED THICKNESS CASING PORTIONS FOR WELDING

BACKGROUND OF THE INVENTION

This invention relates to hermetic type compressors for use in household coolers and refrigerators. More particularly, the invention relates to a hermetic type compressor wherein the cylinder of a compressor unit enclosed in a casing is secured or fixed to the casing by welding, and also to a method for welding the cylinder to the casing.

Hermetic type compressors wherein a compressor unit and an electric motor for driving the same are enclosed entirely in a casing are widely known. The compressor unit is ordinarily of a rotary type comprising a cylinder, a roller rotatable within the cylinder, and a blade which is urged against the peripheral surface of the roller for dividing the internal space of the cylinder into a suction chamber and a compression chamber. When assembling the above described hermetic type compressor, the cylinder of the compressor unit is inserted into the casing in a light force fit manner, and secured to the casing by welding carried out from outside of the casing.

Such a procedure, however, has been found to be disadvantageous in that a welding machine of a large capacity is required because of the comparatively thick casing through which welding is required to be carried out from outside, and that the heat created by the welding, which is inevitably of a considerable amount, tends to deform the outer casing and the cylinder of the compressor unit inclusive of a groove for receiving the blade, thus rendering the operation of the compressor unit unstable and unreliable.

For obviating the above described difficulties, there has been proposed another arrangement wherein a number of through holes are provided beforehand at positions where the cylinder of the compressor unit is desired to be secured to the outer casing by weldings and welding is carried out from the outside of the casing through these holes.

In this case, although the heat created by welding can be substantially reduced, flashes or burrs (or projections) formed between the inner surface of the casing and the outer surface of the cylinder, around these holes, inevitably form an irregular gap between the casing and the cylinder, thereby causing misalignment of the cylinder or an uneven air gap in the electric motor. Furthermore, lack of weld metal in the holes frequently produces void or leakage paths through these holes.

SUMMARY OF THE INVENTION

A primary object of the present invention is to provide a hermetic type compressor wherein all of the above described difficulties caused at the time of securing the cylinder of the compressor unit to the outer casing can be substantially eliminated.

Another object of the invention is to provide a method for welding the cylinder of the compressor unit to the outer casing without accompanying excessive heat, and thereby to substantially improve the reliability and the operational characteristics of the compressor assembly.

According to the present invention, there is provided a hermetic type compressor comprising a casing of a totally enclosing type, an electric motor accommodated in the casing for rotating a driving shaft, and a compressor unit fitted in the casing and operatively connected to the motor for compressing a refrigerant, the compressor unit comprising a cylinder forcibly inserted into the casing so as to contact with the inner surface of the casing, a roller coupled with an eccentric portion of the driving shaft so that the roller is eccentrically rotated in the cylinder, and a blade slidably contacting with the outer surface of the roller to be reciprocable in a groove formed in the cylinder to divide the internal space of the cylinder into a suction chamber and a compression chamber, and the casing is provided with reduced thickness portions on the outer surface of the casing through which welding can be carried out from outside of the casing for securing the cylinder of the compressor unit to the casing with a reduced amount of heat generated from the welded portions.

In another aspect of the present invention, there is provided a welding method in a hermetic type compressor comprising a casing of a totally enclosed type, an electric motor provided in the casing for rotating a driving shaft, and a compressor unit operatively connected to the motor and including a cylinder forcibly fitted in the casing so as to contact with the inner surface thereof, the welding method comprising the steps of forming reduced thickness portions on the outer surface of the casing surrounding the cylinder of the compressor unit, and carrying out welding from the outside of the casing at the reduced thickness portions for securing the cylinder of the compressor unit to the casing.

The invention will be described in more detail with reference to the accompanying drawings.

BRIEF DESCRIPTION OF THE DRAWINGS

In the accompanying drawings:

FIG. 1 is a sectional view taken along the longitudinal axis of a hermetic type compressor;

FIG. 2 is a cross-sectional view taken along a line II—II in FIG. 1;

FIG. 3 is a partial sectional view showing a conventional construction of a portion through which the cylinder of a compressor unit is welded to the casing of the enclosed type compressor;

FIG. 4 is a partial sectional view showing another conventional construction of the welding portion;

FIG. 5 is a partial sectional view showing a disadvantageous result caused by the second conventional construction shown in FIG. 4;

FIG. 6 is a partial sectional view showing a construction of the welding portion constituting a first embodiment of the present invention;

FIG. 7 is a partial sectional view showing a welded result obtained in accordance with the first embodiment of the invention;

FIG. 8 is a partial sectional view showing a welding portion constructed in accordance with a second embodiment of the invention; and FIG. 9 is a perspective view of a part of the cylinder which is to be welded to the casing in accordance with the second embodiment of the invention.

DESCRIPTION OF THE PREFERRED EMBODIMENTS

For better understanding of the present invention, conventional constructions and methods for welding and securing the cylinder of a compressor unit to the casing of the hermetic type compressor will now be described with reference to FIGS. 1 through 5.

FIGS. 1 and 2 illustrate a conventional hermetic type compressor comprising a casing 1, an electric motor 2 and a rotary type compressor unit 3 arranged in an up-and-down relation in the casing 1. The compressor unit 3 comprises a cylinder 4 lightly forced into the casing 1 and secured thereto by welding, a roller 5 provided in the cylinder 4 to be rotated eccentrically in the cylinder 4, and a blade 6 urged against the outer surface of the roller 5 so that the blade 6 divides the internal space of the cylinder 4 into a suction chamber 21 and a compression chamber 22. The roller 5 is coupled to an eccentric portion 8 formed on a driving shaft 7 of the electric motor 2, while the blade 6 is received freely slidably in a groove 9 formed in the cylinder 4 and urged by a spring 10 against the roller 5.

In a case where the cylinder 4 lightly forced into the casing 1 is welded to the casing 1, it is an ordinary practice that welding is carried out at abutting portions 20 between the cylinder 4 and the casing 1 as shown in FIG. 2 from outside of the casing 1.

Heretofore, since the welding has been carried out from outside of the casing 1 of a comparatively heavy thickness as shown in FIG. 3, a welding machine of a large capacity such as generating 300 A at 30 V for 1–1.2 seconds has been required. Furthermore, the heat generated by welding in the welding portion 20 is thus inevitably increased, causing thermal deformations in the casing 1, cylinder 4, groove 9 formed in the cylinder 4 for receiving the blade 6, and other portions. The thermal deformations tend to cause adverse effects on the operation of the compressor unit 3 and to reduce the reliability of the same.

In order to eliminate this difficulty, there has been proposed a construction wherein a small through hole 11 is formed in the casing 1 at each portion to be welded as shown in FIG. 4, and welding is carried out through these holes 11 for reducing heat thereby generated.

In this case, however, flashes or burrs are inevitably created between the inner surface of the casing 1 and the outer surface of the cylinder 4 around these holes 11, which in turn produce an irregular gap between the casing 1 and the cylinder 4. As a consequence, a misalignment of the cylinder 4 or an uneven air gap in the electric motor 2 tends to be caused thereby impairing the operations of the electric motor 2 and the compressor unit 3. Furthermore, the hole 11 is frequently filled by an insufficient amount of weld metal 13, tending to leave a leakage path therethrough as shown in FIG. 5. In addition, it is required that the welding is carried out with the compressor laid down horizontally so that the welding may be carried out from the upper side of the portions to be welded to settle metals 13 in the holes 11 by gravity. Such a procedure, however, makes it impossible to weld more than three portions 20 simultaneously.

FIG. 6 illustrates a preferred embodiment of the present invention, wherein a desired number of reduced thickness portions 14, each formed with a conical recess 15 opening outwardly, are provided in the wall of the casing 1 at circumferential positions thereof, so that the cylinder 4 of the compressor unit 3 is fixed to the casing 1 through the reduced thickness portions 14. The thickness b of the reduced thickness portion 14 is far smaller than that of the casing 1, preferably smaller than $\frac{1}{2}$ of the thickness c of the casing 1. The cylinder 4 of the compressor unit 3 is fixed to the casing 1 by arc welding carried out at the spot of each recess 15 from the outside of the casing 1. The welding power required for the welding carried out at the reduced thickness portions 14 of the thickness b is substantially reduced in comparison with that required in the conventional case where welding is carried out from outside of the casing 1 having the thickness c. Thus the thermal stresses and strains caused in the casing 1 and hence the deformation of the cylinder, such as deformation from the true circle of the cylinder 4 and deformation of the blade-receiving groove 9 can be minimized.

Because of the existence of the conical recess 15, any possibility of the welding rod or wire in the arc-welding machine being accidentally displaced off the centerline d of the recess 15 can be obviated, and a welded condition as shown in FIG. 7 wherein the cylinder 4 is satisfactorily fixed to the casing 1 can be obtained. In this case, since the weld metal 13 reaches the cylinder 4 through the reduced thickness portion 14 of the casing 1, any possibility of producing a leakage path through the welded portion can be obviated regardless of the presence of a portion 16 in the recess 15 having an insufficient amount of weld metal.

FIGS. 8 and 9 illustrate another embodiment of the present invention, wherein a part of the casing 1 opposing to the cylinder 4 of the compressor unit 3 is press-formed into frustoconical recesses opening outwardly of the casing 1 so that a reduced thickness portion 14 and an inwardly projecting portion 12 are provided at the bottom of each frustoconical recess. In order to clear the projections 12 from the casing 1 when the cylinder 4 is inserted into the casing 1, clearance grooves 17 of a size and number corresponding to those of the projections 12 are provided on the outer surface of the cylinder 4 so that a relation of $e > a$ is maintained between the depth e of groove 17 and the height a of the projection 12. In this embodiment, since the size of the reduced thickness portions 14 is selected to be larger than that of the previous embodiment, the welding in the portions 14 is far easier than that in the previous embodiment. Furthermore, since clearance grooves 17 are formed on the outer surface of the cylinder 4 at positions opposing to the projections 12 formed on the inner surface of the casing 1, there is no possibility of the projections 12 rendering adverse effects to the cylinder 4, for instance, bringing the cylinder 4 out of alignment with casing 1, or causing uneven air gap in the electric motor 2, and the torque required for starting the electric motor can be reduced.

The advantageous features of the present invention can be summarized as follows.

(1) Since reduced thickness portions are provided at positions where the cylinder of the compressor unit is welded to the outer casing, the amount of heat generated in the welding portions can be reduced, and the thermal deformation of the casing and the compressor unit can be substantially reduced.

(2) Because of the above described reason, variations in the inner diameter of the cylinder and the blade receiving groove can be eliminated, so that the movement of the blade is made smooth, and the operation and the reliability of the compressor can be substantially improved.

(3) Since the reduced thickness portions of the casing are spot-welded, wasteful production of the compressor having leakage through the casing can be eliminated.

(4) Since the adverse effects caused by the flashes or burrs produced internally of the casing by welding can be eliminated, occurrence of uneven air gap of the electric motor in the casing can be avoided, and any increase in the required starting torque of the electric motor can be prevented.

I claim:

1. A hermetic type compressor comprising:
a casing of a totally enclosed type;
an electric motor accommodated in said casing for rotating a driving shaft; and
a compressor unit fitted in said casing and operatively connected to said electric motor for compressing a refrigerant,
said compressor unit comprising a cylinder forcibly inserted into said casing so as to contact with an inner surface of said casing, a roller coupled with an eccentric portion of the driving shaft so that said roller is eccentrically rotated in said cylinder, and a blade slidably contacting the outer surface of said roller to be reciprocable in a groove formed in said cylinder to divide the internal space of said cylinder into a suction chamber and a compression chamber,
said casing being provided with reduced thickness portions each having a conical shape on the outer surface thereof in alignment with said cylinder through which spot welding can be carried out from outside of the casing for securing said compressor unit to said casing with a reduced amount of heat from the welded portions.

2. The hermetic type compressor as set forth in claim 1 wherein the thickness of said reduced thickness portions is less than one half of the thickness of said casing.

3. The hermetic type compressor as set forth in claim 1 wherein said reduced thickness portions are provided in the form of bottoms of recesses opening outwardly of the casing.

4. A welding method in a hermetic type compressor comprising a casing of a totally enclosing type, an electric motor accommodated in the casing for rotating a driving shaft, and a compressor unit operatively connected to said motor and including a cylinder forcibly fitted in the casing so as to contact with the inner surface thereof, said welding method comprising the steps of forming conical reduced thickness portions on the outer surface of the casing surrounding the cylinder of the compressor unit and carrying out welding from the outside of the casing at the reduced conical thickness portions for securing the cylinder of the compressor unit to the casing.

5. The welding method as set forth in claim 4 wherein the thickness of said reduced thickness portions is less than one half of the thickness of said casing.

6. The welding method as set forth in claim 4 wherein said reduced thickness portions are provided in the form of bottoms of recesses opening outwardly of the casing.

* * * * *